(12) United States Patent  (10) Patent No.: US 11,645,342 B2
Pingol  (45) Date of Patent: May 9, 2023

(54) PROCUREMENT DATA MANAGEMENT SYSTEM AND METHOD

(71) Applicant: Roumelia "Lynn" Margaret Buhay Pingol, Saint Paul, MN (US)

(72) Inventor: Roumelia "Lynn" Margaret Buhay Pingol, Saint Paul, MN (US)

(73) Assignee: Roumelia "Lynn" Margaret Buhay Pingol, Saint Paul, MN (US)

( * ) Notice: Subject to any disclaimer, the term of this patent is extended or adjusted under 35 U.S.C. 154(b) by 0 days.

(21) Appl. No.: 16/947,734

(22) Filed: Aug. 13, 2020

(65) Prior Publication Data

US 2021/0049220 A1  Feb. 18, 2021

Related U.S. Application Data

(60) Provisional application No. 62/886,268, filed on Aug. 13, 2019.

(51) Int. Cl.
*G06F 16/953* (2019.01)
*G06Q 50/26* (2012.01)

(52) U.S. Cl.
CPC .......... *G06F 16/953* (2019.01); *G06Q 50/26* (2013.01)

(58) Field of Classification Search
CPC ............................. G06F 16/953; G06Q 50/26
USPC ...................................................... 707/706
See application file for complete search history.

(56) References Cited

U.S. PATENT DOCUMENTS

| | | | | |
|---|---|---|---|---|
| 6,760,746 B1* | 7/2004 | Schneider | ............... | H04L 67/60 709/217 |
| 10,157,407 B2* | 12/2018 | Jung | ........................ | H04L 63/10 |
| 10,467,633 B2* | 11/2019 | Hsu | ........................ | G06Q 30/02 |
| 2003/0227487 A1* | 12/2003 | Hugh | .................. | G06F 16/9024 707/E17.011 |
| 2006/0085450 A1* | 4/2006 | Seubert | .................. | G06Q 30/04 |
| 2006/0229896 A1* | 10/2006 | Rosen | ............... | G06Q 10/1053 705/321 |
| 2007/0150387 A1* | 6/2007 | Seubert | .................. | G06Q 10/10 705/31 |
| 2008/0120129 A1* | 5/2008 | Seubert | ................ | G06Q 40/125 705/305 |
| 2008/0267504 A1* | 10/2008 | Schloter | .............. | G06F 16/9554 382/181 |
| 2009/0037356 A1* | 2/2009 | Rothstein | ............... | G06Q 30/08 706/46 |
| 2011/0010304 A1* | 1/2011 | Chan Wong | ....... | G06Q 30/0276 705/317 |

(Continued)

*Primary Examiner* — Mark E Hershley
(74) *Attorney, Agent, or Firm* — Merchant & Gould P.C.

(57) ABSTRACT

Embodiments provide procurement code data management. A data store stores unified code entries, each linked to one or more codebook procurement codes. A user interface engine is configured to receive a search parameter corresponding to the description from a user computing device and to present one or more search results each search result comprising a code entry to the user computing device. A search engine is configured to identify the unified code entry based on the search parameter and the description. A code translation engine is configured to receive the unified code entry, access the code link entry having the unified code identifier as the primary code entry. The one or more search results is determined by selecting references equivalent code entries of the code link entries.

20 Claims, 12 Drawing Sheets

(56) References Cited

U.S. PATENT DOCUMENTS

| | | | |
|---|---|---|---|
| 2011/0296401 A1* | 12/2011 | DePoy | G06Q 30/0609 |
| | | | 717/174 |
| 2012/0215560 A1* | 8/2012 | Ofek | G16H 10/00 |
| | | | 705/3 |
| 2013/0311266 A1* | 11/2013 | Vichich | G06Q 30/0207 |
| | | | 705/14.27 |
| 2018/0232428 A1* | 8/2018 | Fleming | G06F 16/26 |
| 2019/0129981 A1* | 5/2019 | Haas | G06F 16/27 |
| 2019/0130050 A1* | 5/2019 | Haas | G06F 16/215 |

* cited by examiner

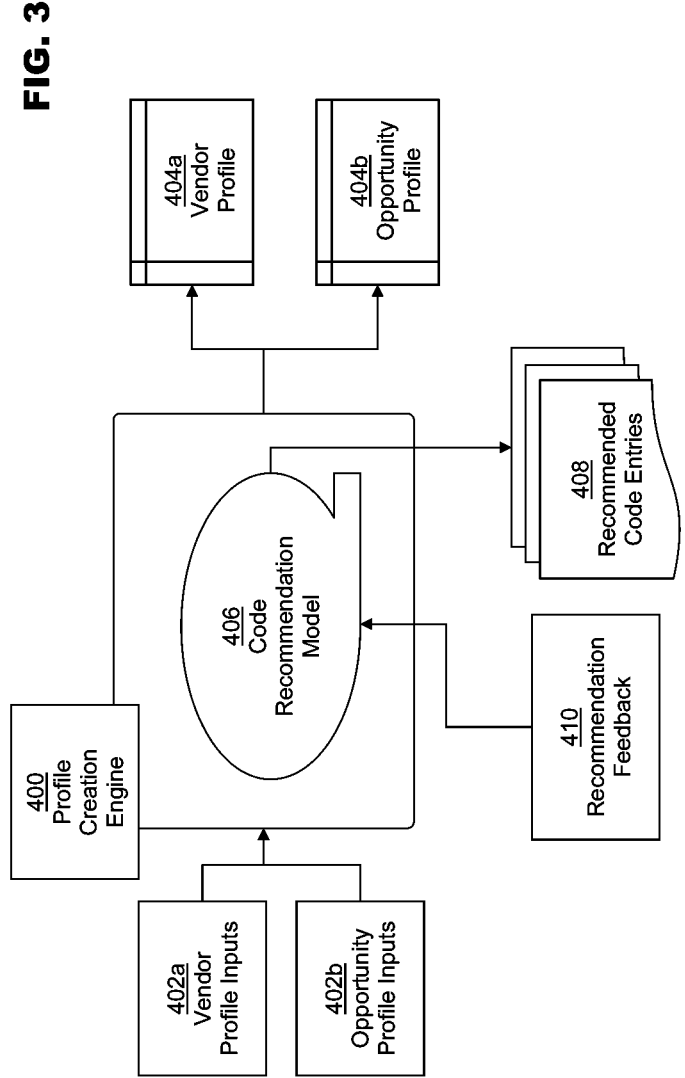

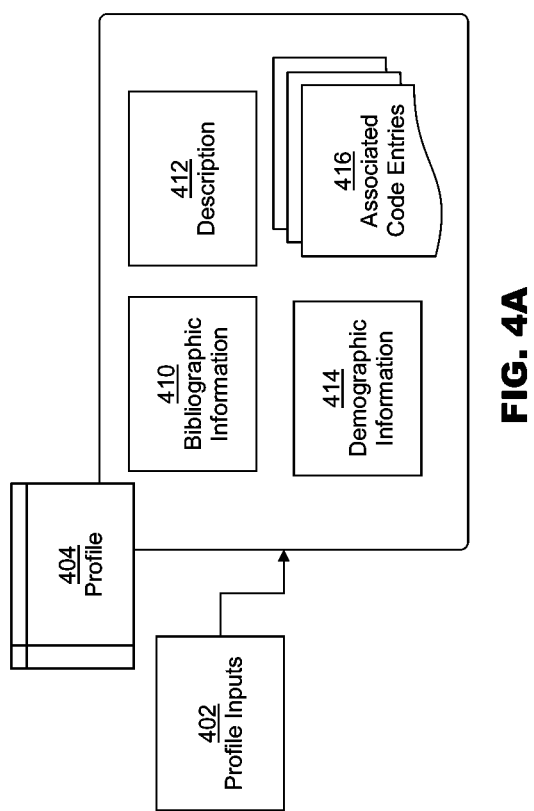

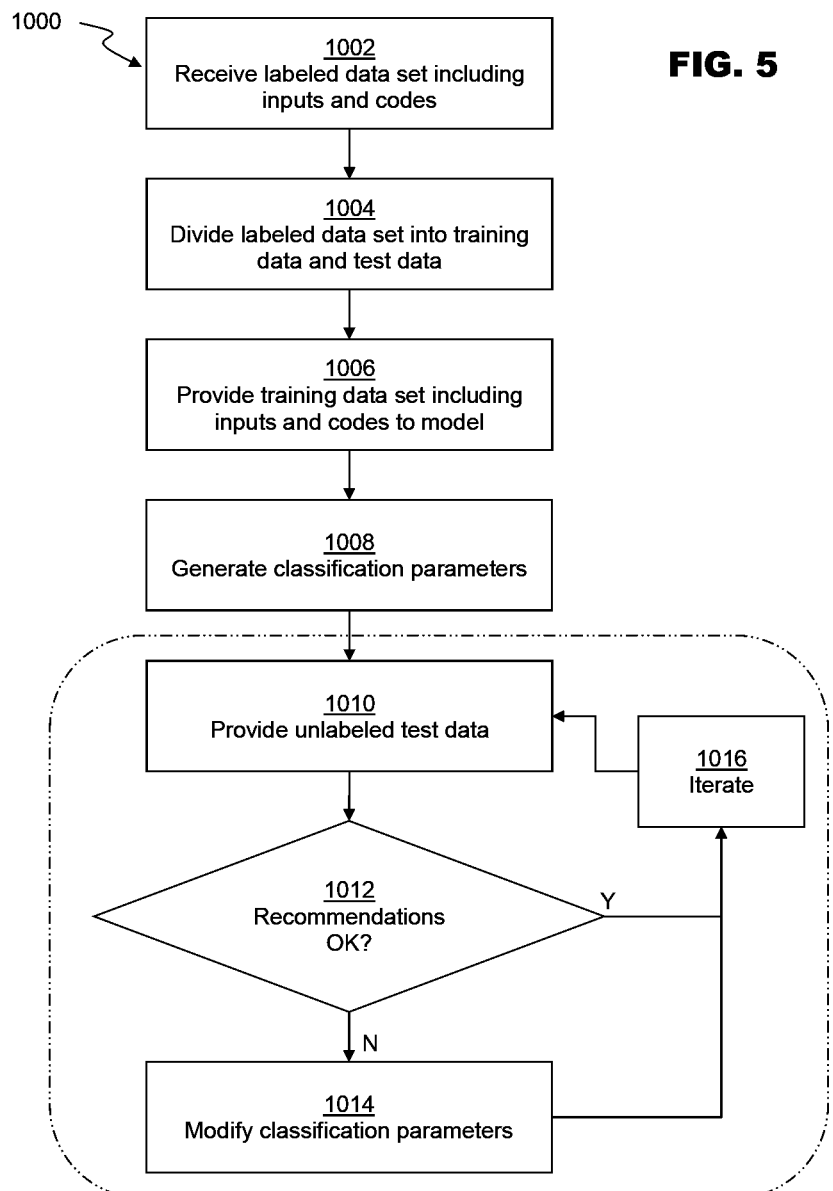

PROCUREMENT DATA MANAGEMENT SYSTEM AND METHOD

CROSS-REFERENCE TO RELATED APPLICATION

The present application claims the benefit of U.S. Provisional Application No. 62/886,268 filed Aug. 13, 2019, which is incorporated by reference in its entirety herein.

TECHNICAL FIELD

Embodiments of the present disclosure relate generally to the field of data management, and more particularly to the efficient determination and translation of procurement codes.

BACKGROUND

A numerical coding system exists in procurement and contracting that involves public, private and government sectors. Within each numerical system exists another layer of codes and definitions that cross over to various industries. These codes exist at the federal, state, county, and city levels to allow the government to procure or contract for goods and services. There exists no consistent reference to identifying them to a user looking to offer their goods and services, or a user seeking those same goods and services.

The most common procurement code is the North American Industry Classification System (NAICS). Businesses who wish to work or contract with the government can self-classify themselves using the best description of their primary business activity. The NAICS was developed for use by federal statistical agencies for the collection, analysis and publication of statistical data related to the economy. Various government agencies, trade associations, and regulatory boards have adopted the NAICS classification systems. Today, most agencies post requests for contract bids using NAICS code. For example, the Small Business Administration (SBA) posts requests using NAICS codes through the System for Award Management (SAM). As a result, NAICS has become one of the widely used qualifiers in government procurement and contracting.

One large agency using the NAICS code as a qualifier for finding small businesses to provide goods and contract services, is the United States Department of Transportation (USDOT). The USDOT sponsors the Disadvantaged Business Enterprise (DBE) certification program. The DBE certification program targets and sets goals to increase participation of minority, women-owned and economically disadvantaged businesses in government contracting. USDOT sets goals for general contractors to meet for nearly every federally funded project. One of the considerations for determining the percentage goals per project is to identify the number of businesses who can perform work within a particular industry. In theory, this can be determined based on the NAICS codes of each DBE certification. In practice however, DBE certifications often do not include the correct, or all, of the codes that represent the capabilities and capacities of various DBEs.

In addition, county, city, and local government levels have adopted similar programs using the NAICS code assist in meet goals for their minority and women goal participation, and even created their own subset category codes. Examples of such codes include General Services Administration (GSA) codes, the National Institute of Governmental Purchasing (NIGP) Commodity/Services code, the Commercial and Government Entity (CAGE) code, and Society for Worldwide Interbank Financial Telecommunication (SWIFT) Business Identifier codes (BIC) codes.

Some agencies, such as certain state Departments of Transportation further create their own procurement systems using specific bid or pay item codes. Similarly, agencies such as GSA have created multiple codes such as schedule or special item number (SIN) codes. In some jurisdictions, agencies simply elect to use the preexisting NIGP, CAGE, or SWIFT codes. Regardless, small businesses are left to navigate a labyrinth of procurement and contracting processes across the different agencies and the various sets of government procurement and industry codes.

Conventional systems do not solve the problems caused by disparate code systems. Systems exist that enable discovery of codes via keyword searches. Other systems enable discovery of a code in one system based on a code in another system, such as systems that link merchant codes to NAICS codes, or SIC codes to NAICS.

A need exists, however, for an inclusive platform that interconnects a plurality of different procurement codes, for use by end users seeking contracting opportunities.

SUMMARY

Embodiments of the present disclosure meet the need for systems and methods to correlate, connect, and translate multiple distinct procurement and industry codes. Embodiments assist with the process of procurement and contracting from start to finish by consolidating the different procurement codes involved within the process. These codes may include but are not limited to those used by the government, industry and others.

Embodiments can translate codes into an understandable and searchable format for users seeking to bid, quote, contract and/or provide their goods and services. These codes can include, but are not limited to NAICS, American Institute of Architects (AIA), GSA Schedule, category and SIN codes, federal or state Department of Transportation (DOT) bid codes or pay item codes, corporate identification codes such as AMAZON standard identification numbers (ASIN), and state/county/city procurement codes, such as SWIFT, CAGE, NIGP, etc.

Once users enter their data, embodiments can cross reference and index the data until it is sorted and queried to produce results that are easy to understand and use for the purpose of, but are not limited to, contracting or procuring work and/or services. With this translated data, users can interact on the platform. For example, in the case of a construction project, a project owner can post a project for bidding associated with a set of codes, like AIA codes. Embodiments can connect the project owner's selected AIA codes with other potential project related codes, allowing them to connect and search the recommended translated code options. The project owner can then market or send invitations to bid, receive quotes, award the bid, or close the bid to targeted users within the system who share this translated code. This same translated data can also produce reports such as statistical data, marketing demographics, contractor profiles, etc. Embodiments can demystify the procurement coding system that exists because of the various systems in place within the government, private, and public sectors.

In one aspect of the present disclosure, a system for procurement data management includes a memory comprising a data store. The data store can store a first procurement code entry comprising a first codebook identifier and a first code identifier, a second procurement code entry comprising a second codebook identifier and a second code identifier, a unified code entry comprising a unified code identifier and a description, and a code link entry comprising a reference to the unified code identifier as a primary code entry, and references to the first code entry and second code entry, respectively, as equivalent code entries.

Embodiments can comprise a processor coupled to the memory and programmed with executable instructions. The instructions, when implemented, can cause the processor to provide a plurality of engines. A user interface engine can be configured to receive a search parameter corresponding to the description from a user computing device communicably coupleable to the processor, and to present one or more search results to the user computing device. A search engine can be configured to identify the unified code entry based on the search parameter and the description. A code translation engine can be configured to receive the unified code entry, access the code link entry having the unified code identifier as the primary code entry, and to determine the one or more search results by selecting the equivalent code entries of the code link entry.

In embodiments, the data store can further store a vendor profile and an opportunity profile, each of the vendor profile and the opportunity profile including a reference to the unified code entry. The search engine can be further configured to identify the vendor profile and the opportunity profile based on the search parameter and the description.

In embodiments, the search parameter can comprise a reference to the vendor profile. The search engine can be configured to identify the opportunity profile based on the vendor profile and the description. In embodiments, the search parameter can comprise a reference to the opportunity profile. The search engine can be further configured to identify the vendor profile based on the opportunity profile and the description.

In embodiments, a profile creation engine can be configured to receive profile inputs, generate one or more recommended code entries based on the profile inputs, and store a profile in the data store. The profile can include a reference to at least one of the recommended code entries. The profile input can be a vendor profile input, and the profile can be a vendor profile. The profile input can be an opportunity profile input and the profile can be an opportunity profile.

In embodiments, the user interface engine can further be configured to present the one or more recommended code entries to the user computing device to receive an indication of user confirmation or rejection.

In embodiments, a code recommendation model can be configured to generate the one or more recommended code entries based on the profile inputs and at least one machine-learning parameter, and to modify the at least one machine-learning parameter if the user interface engine receives an indication of user rejection.

In one aspect of the present disclosure, a method for procurement code management includes storing, in a data store of a memory, a first procurement code entry comprising a first codebook identifier and a first code identifier, a second procurement code entry comprising a second codebook identifier and a second code identifier, a unified code entry comprising a unified code identifier and a description, and a code link entry, the code link entry comprising a reference to the unified code identifier as a primary code entry, and references to the first code entry and second code entry, respectively, as equivalent code entries. The method can include receiving, by a processor coupled to the memory, a search parameter corresponding to the description from a user computing device communicably coupleable to the processor. The method can include identifying the unified code entry by searching the data store for a unified code entry having a description corresponding to the search parameter, accessing the code link entry having the unified code identifier as the primary code entry, and determining search results comprising the first code entry and the second code entry. The search results can be transmitted to the user computing device for presentation to the user.

In embodiments, the method can include storing a vendor profile and an opportunity profile, each of the vendor profile and the opportunity profile including a reference to the unified code entry, and the search results can further comprise at least one of the vendor profile or the opportunity profile. The vendor profile and the opportunity profile can be identified based on the search parameter and the description.

In embodiments, the method can include receiving profile inputs, generating one or more recommended code entries based on the profile inputs, and storing a profile in the data store. The profile can include a reference to at least one of the recommended code entries. The method can include transmitting the presenting the one or more recommended code entries to the user computing device to receive an indication of user confirmation or rejection.

In embodiments, the method can include generating the one or more recommended code entries by a code recommendation model based on the profile inputs and at least one machine-learning parameter. The method can further include modifying the at least one machine-learning parameter if the user interface engine receives an indication of user rejection.

In embodiments, the method include facilitating communication between a first user associated with the vendor profile and a second user associated with the opportunity profile. Facilitating communication between the first user and the second user can include transmitting a recommendation to the first user to submit a proposal for to the second user, and/or transmitting a recommendation to the second user for the second user send a request for proposal to the first user.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

FIG. 3 is a schematic diagram depicting a profile creation engine is a schematic diagram depicting procurement code data structures, according to an embodiment.

FIG. 4A is a schematic diagram depicting a profile data structure, according to an embodiment.

FIG. 5 is a flowchart depicting a method for training a code recommendation model, according to an embodiment.

Figure 1:
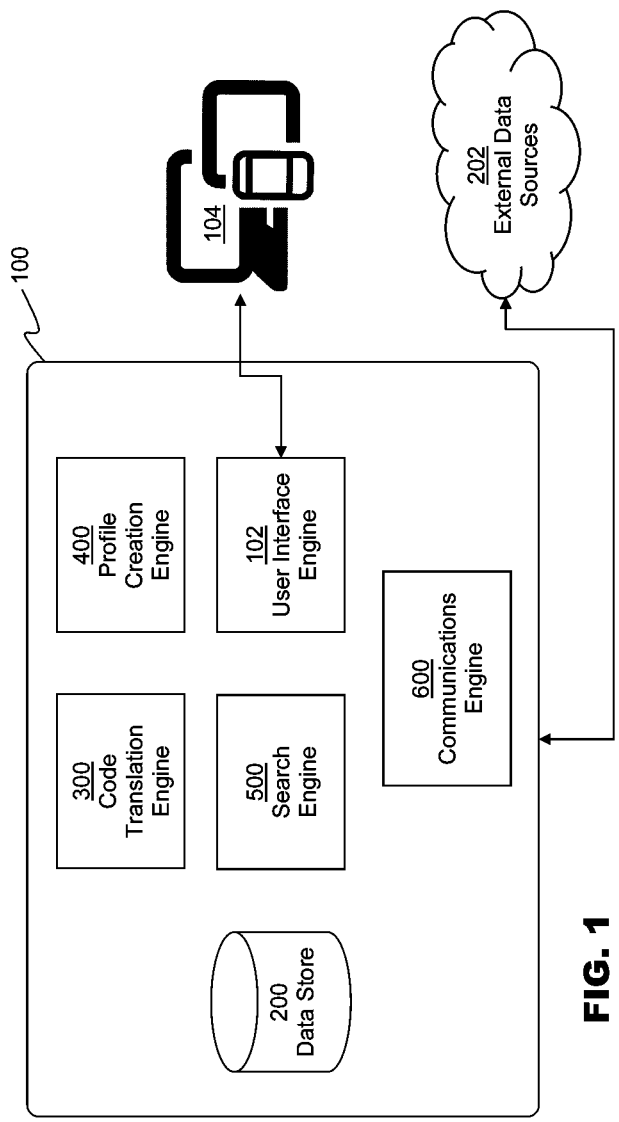
FIG. 1 is a schematic diagram depicting components of a procurement data management system, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

FIG. 1 is a schematic diagram depicting components of a procurement code management system 100, according to an embodiment. Procurement code management system 100 can comprise user interface engine 102, data store 200, code translation engine 300, profile creation engine 400, search engine 500, and messaging engine 600. Components and subcomponents of system 100 are described in more detail below.

The various components and engines of system 100 can reside on, or be executed by, a single computing device in embodiments. In other embodiments, the components and engines of system 100 can reside on, or by executed by, a plurality of computing devices in continuous or intermittent, wired or wireless, data communication with each other such that the systems and methods described herein can be executed in parallel. For example, each component can be executed within a separate physical or virtual computing environment with respect to other components of system 100. The components of system 100 can communicate via wired or wireless networks, local or remote procedure calls, shared file system entries, physical ports, or the like. Such parallel processing can provide improvements to the scalability and reliability of system 100, as dependence on individual computing environments can be lessened. Similarly, the reliability of individual components can be evaluated by comparing the result provided by two or more components performing similar data operations using similar data.

System 100 can present one of more user interfaces to various users via user interface engine 102. Each user interface can be a command line interface, a graphical user interface, a web browser accessible interface, an augmented reality interface, or any other interface that can receive user input and present outputs of system 100 to the user. In an embodiment, each user interface can be a programmatic interface, such that the user can be a computing system, robot, or other electronic device.

As an example, user interface engine 102 can provide a web-based or app-based user interface that can be presented to and accessed by a user via a user computing device 104. User interface engine 102 can receive user inputs and provide user outputs regarding configuration, operation, and data storage of system 100. User interface engine 102 can comprise or present a mobile application, web-based application, or any other executable application framework either independently, or in combination with software and hardware of user computing device 104. The user interface can reside on, be presented on, or be accessed by any user computing devices 104 capable of communicating with the various components of system 100, receiving user input, and presenting output to the user. In embodiments, user computing devices 104 can comprise a laptop computer, desktop computer, a smartphone, a tablet computer, or other mobile or stationary computing device. User computing device 104 can be the, or one of the computing devices on which the various engines of system 100 also reside on or be one or more separate computing devices communicably couplable to system 100.

Data store 200 can comprise one or more database, file systems, memories, or other data storage systems known in the art. Data store 200 can comprise a single data store, present on a single computing device in an embodiment. In other embodiments, data store 200 may be present on one or more database systems physically separate from other components of system 100. In other embodiments, data store 200 may be present distributed across multiple separate computing devices, each with associated data stores. In embodiments, data store 200 may comprise one or more relational databases with tabular structure, NoSQL, or other non-relational databases with key-value, grid, or other structures. Data store 200 may comprise one or more flat files such as text files, binary files, image files, or any other file type.

Data store 200 can comprise logical groupings of data for use by various engines of system 100. Numerous types and structures of data, that can be stored, indexed, and through embodiments of data store 200. Where, as depicted or described, data structures are said to include or be associated with other data structures, it should be understood that such other data structures may be stored within or in association with each data structure, or may be referenced by other data structures through the use of links, pointers, or addresses, or other forms of referencing data.

In embodiments, the access of data within data store 200 by can be secured to prevent unwarranted dissemination of information. For example, users be required to authenticate prior to accessing data, or even information including the identifiers of data records. Communications between components of system 100 and user computing devices 104 can be cryptographically secured in embodiments. Further, users interface engine 102 can comprise user registration and authentication components such that certain data within data store 200 is only available to users with appropriate permission levels.

Figure 2A:
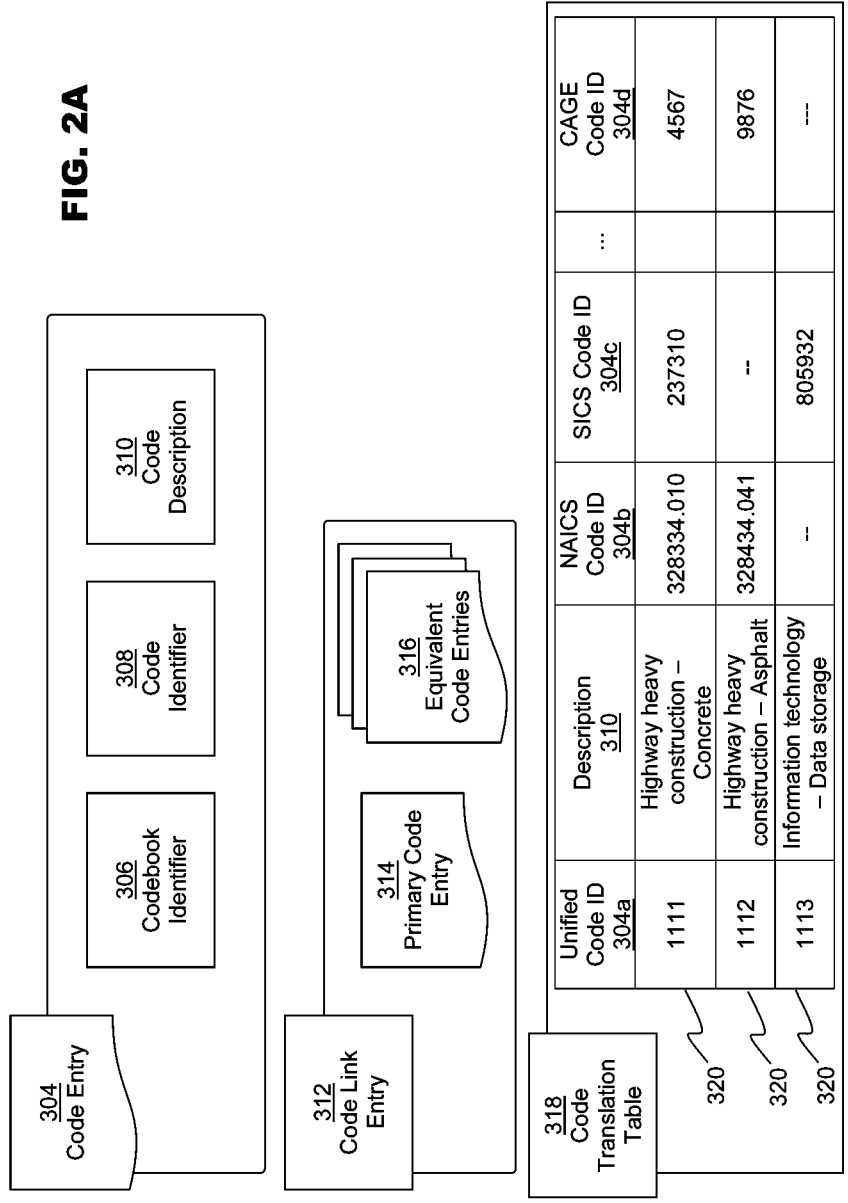
FIG. 2A is a schematic diagram depicting procurement code data structures, according to an embodiment.

FIG. 2A is a schematic diagram depicting procurement code data structures as may be stored in data store 200. Codebook information can be provided by manual entry, for example through user interface engine 102, programmatically through API calls to external data providers 202, by receiving data files through data store 200, or any other means. In embodiments, data store 200 can store can create a plurality of code entries 304, each storing data associated with a code of a codebook. Each code entry 304 can comprise a codebook identifier 306, a code identifier 308 and a code description 310.

Codebook identifier 306 can comprise text, numerical, or other data identifying a source of the codebook entry 304. For example, in embodiments codebook identifier 306 can represent NAICS, SIC, GSA schedule, category and special item number (SIN) codes, American Institute of Architects (AIA) codes, DOT bid or item codes, state, county, or city procurement codes, or other code sources. Code identifier 308 can comprise text, numerical, or other data representing the individual code or symbol related to a code. Code description 310 can comprise a brief description, and/or a link or locator of additional information describing the code. In embodiments, code description 310 can further comprise metadata regarding the code entry 304, such as significant key words, disambiguation terms, or version information of the code entry or codebook.

Code translation engine 300 can create and maintain a plurality of code link entries 312. Each code link entry 312 can comprise a link to or identifier of a primary code entry 314, and one or more equivalent code entries 316. As such, code link entries can be used to create one or more code translation tables 318. As depicted in the example of FIG. 2A, translation tables 318 can comprise a plurality of rows, each having a column for a different code entry 304, as linked via code link entries 312, though other structures may of course be used.

In embodiments, code translation engine 300 can generate or maintain a codebook including unified codes 320. The unified codebook can then be used as a master codebook, such that each code entry of other codebooks is linked, through one or more code link entries 312 to at least one unified code entry 320y. For example, as depicted in the example code translation table 318 of FIG. 2, each row can comprise a code entry 304 with a codebook identifier 306 that corresponds to the unified codebook, such that the first column can comprise unified code entries 304a. Additional columns can comprise equivalent code entries 316 from other codebooks such as NAICS 304b, SIC 304c, and CAGE 304d. In embodiments, each unified code 320 can be linked to one or more six-digit NAICS national industry codes. Each unified code 320 can be linked to one or more individual index entries of specific national industry codes. In embodiments, unified codes 320 can indicate certain capacities, capabilities, and characteristics of entities. For example, unified codes 320 can indicate that an entity is minority-, woman-, or veteran-owned, or has other characteristics that may qualify as a targeted group business (TGB).

In embodiments, code translation tables 318 can be pre-generated based on code link entries 312 and code entries 304, in order to maximize runtime performance of code translator engine 300. In alternative embodiments, code translation tables 318 can be generated only upon request, in order to maximize data storage efficiency. While code translation tables 318 are depicted and described herein as stored in a tabular grid format, other storage formats or architectures as known in the art can be used.

Figure 2B:
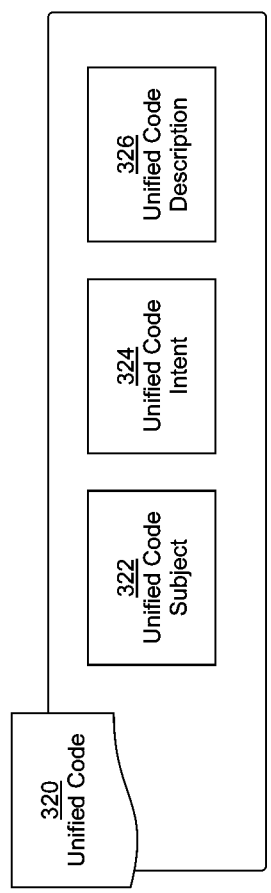
FIG. 2B is a schematic diagram depicting a unified code data structure, according to an embodiment.

FIG. 2B is a schematic diagram depicting components of a unified code 320. As discussed above with respect to FIG. 2A, each unified code 320 can correspond to a code entry 304. In addition, unified code 320 can have a unified code subject 322, and a unified code intent 324. A unified code description 326 can correspond to code description 310, though in embodiments unified code description 326 can comprise components determined based on unified code subject 322 and unified code intent 324.

Unified code subject 322 can comprise a general or specific service, article of manufacture, classification, or category as may be derived based on various codebooks. For example, a unified code subject 322 may correspond to a product type such as "gypsum boards." Unified code intent 324 can differentiate unified code subjects 322 based on activities needed or performed with respect to products or services indicated unified code subject 322. Unified code intents 324 can include actions such as purchasing, selling, manufacturing, installing, repairing, and removal of items.

FIG. 3 is a schematic diagram depicting components and architecture of a profile creation engine 400, according to an embodiment. Profile creation engine 400 can receive vendor profile inputs 402a and generate vendor profiles 404a. Profile creation engine 400 can further receive opportunity profile inputs 402b and generate opportunity profiles 404b. Profiles 404 can be stored in data store 200 for search or reference purposes. Each vendor profile 404a can contain data defining and/or describing a vendor, such as a business entity, contractor, or other product or service provider that may have the capability to meeting one or more requirements or criteria of opportunities that may be publicized by one or more government entities or affiliates (such as subcontractors.) Each opportunity profile 404b data defining and/or describing a opportunity, such as a request for proposal (RFP), request for quote (RFQ), job listing, or other need of an entity or affiliate.

FIG. 4A is a schematic diagram depicting the data structure of a profile 404. Profiles 404 can comprise bibliographic information 410, which can include text, numeric, image, or other data identifying a vendor or an opportunity. For example, vendor bibliographic information 410 can include company name, individual name(s), addresses, registration numbers, and the like. Similarly, opportunity bibliographic information 410 can include the name of the company or agency presenting the opportunity, individual name(s), addresses, request numbers, registration numbers, and the like.

Description 412 can include data describing the vendor or opportunity. For example, description 412 could include a resume or CV, portfolio, request for quote details, or links to additional information in external sources, such as Internet web pages. Demographic information 414 can comprise data regarding company or individual age, years of service/experience, size, membership in targeted groups, or other status information.

Each profile 404 can further include a plurality of associated code entries 416. Associated code entries 416 can comprise code entries 304, and/or links to code entries 304. In embodiments, code entries 416 can be unified code entries 320, or can be code entries 304 with other codebook identifiers.

In embodiments, profile inputs 402 can be received via manually entry, or programmatically from one or more external data sources 202. In embodiments, profile creation engine 400 can provide one or more assessments, questionnaires or forms that can be presented to a user via user interface engine 102 for entry of inputs 402. Profile creation engine 400 can, in embodiments, comprise hardware and software configured to automatically scrape or crawl one or more network accessible sources of input data such as government websites, business profiles, job posting services third-party intelligence sources, or other external data sources 302, and the like in order to discover inputs 402. In an embodiment, a profile creation application programming interface API can be presented by profile creation engine 400. The profile creation API can comprise software and/or hardware interfaces enabling programmatic input of profile inputs 402.

Any codes provided as part of profile inputs 402 can be provided to code translation engine 300 to determine one or more unified codes that are equivalent to the input codes. Unified code entries 320 can then be stored with profiles 404 as associated code entries 416. In embodiments, recommended unified code entries 320, or other recommended code entries 304 can be provided via user interface engine 102 to the user for verification and acceptance.

In embodiments, profile creation engine 400 can further comprise, or interact with code recommendation model 406. Code recommendation model 406 can comprise a natural language processor, parser, classifier, text recognizer or other text interpretation technology such as a machine learning model that can receive inputs 402, and produce one or more recommended code entries 408 which can be presented via user interface engine 102 for confirmation. Code recommendation model 406 can comprise a rule-based text processor, a statistical processor, neural network, Markov chain, or other algorithm or architecture for determining recommended codes entries 408 based on inputs 402. In an embodiment, code recommendation model 406 can comprise a simple list of keywords that are assumed to be associated with code entries 304, such that inputs 402 can be searched for the presence of keywords to and recommended code entries 408 can comprise a list of any associated code entries 304. In embodiments, the list of keywords can be derived from code descriptions 310 of existing code entries 304. Regardless of the architecture of code recommendation model 406, code recommendation model 406 can comprise one or more parameters, such as machine-learning parameters, or keywords, that can be configured, modified or trained based on feedback.

Code recommendation model can be initially trained or configured using supervised or unsupervised machine-learning techniques and any recommendation feedback 408 received can be provided to code recommendation model 404 for additional training. Code recommendation model 404, therefore, can attempt to determine appropriate code entries 304 based on the data provided in vendor profile inputs. Code recommendation model 404 can further by trained based on codes extracted from inputs 402 and any associated text provided with inputs 402.

Figure 4B:
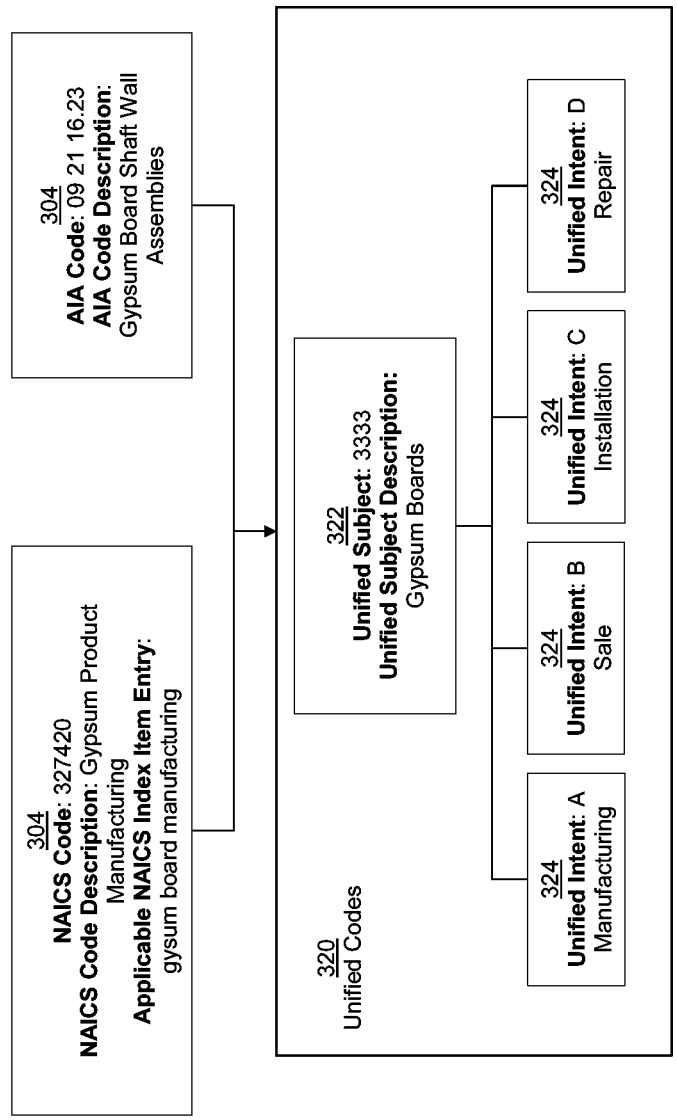
FIG. 4B is a schematic diagram depicting example code entries and unified codes, according to an embodiment.
Figure 4C:
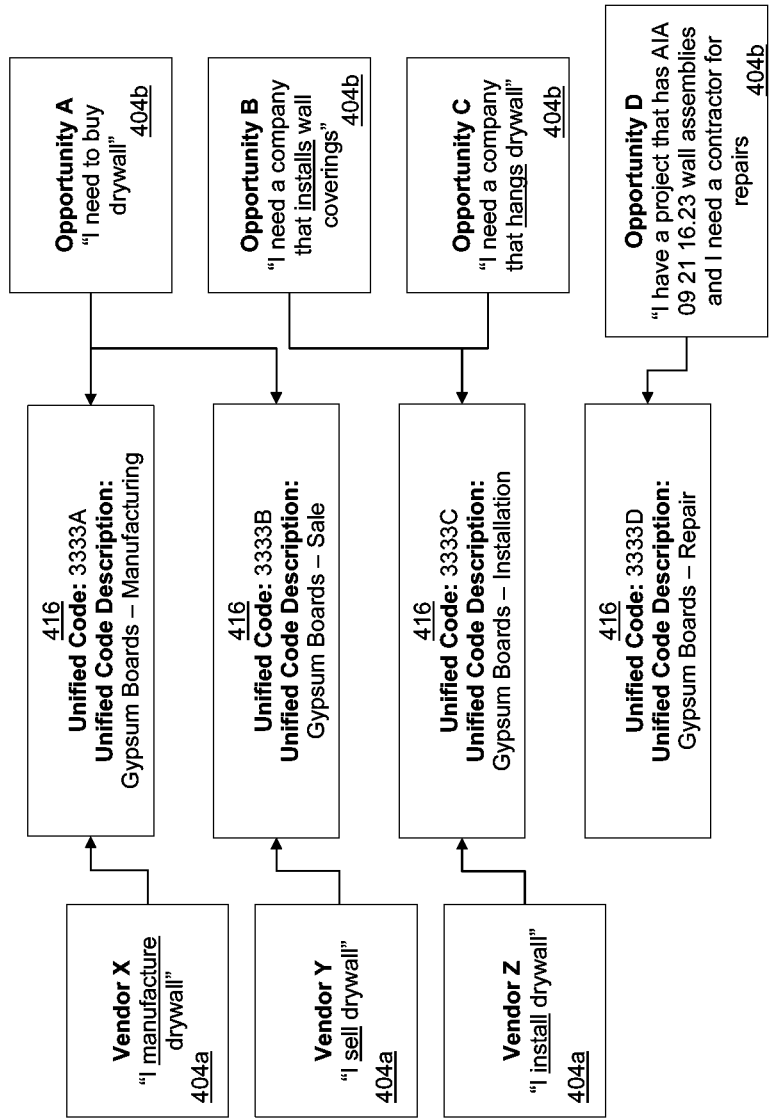
FIG. 4C is a schematic diagram depicting example profile data and unified codes, according to an embodiment.

FIGS. 4B and 4C are schematic diagrams depicting example code entries 304, unified codes 320, and profiles 404. As depicted in FIG. 4B, a first code entry 304 represents a NAICS code related to gypsum product manufacturing, and more particularly to gypsum board manufacturing. A second code entry 304 represents an AIA code related to gypsum board shaft wall assemblies. Each of these example code entries is linked to a plurality of unified codes 320. Each of the depicted unified codes includes a unified subject and unified description related to gypsum boards. Each of the unified codes further has an associated intent 324, indicating the manufacture, sale, installation, or repair of gypsum boards.

These unified codes are also depicted in FIG. 4C, in relation to example vendor profiles 404a, and opportunity profiles 404b. Vendor X has a profile 404a that indicates that Vendor X manufactures drywall. The associated code entries 416 of the profile 404a of Vendor X include a unified code with an identifier of "3333A" and a description of "Gypsum Boards—Manufacturing." Similarly, Vendor Y, which sells drywall is associated with unified code identifier "3333B," described as "Gypsum Boards—Sale." Vendor Z, which installs sheet rock has a profile associated with unified code identifier "3333C," described as "Gypsum Boards—Installation."

FIG. 4C further includes opportunity profiles 404b for Opportunities A-D. Opportunity A, which could have been entered by Vendors Y or Z, or another agency or entity, has a profile indicating the need to buy drywall. Opportunity A is therefore associated with unified codes "3333A" and "3333B" for the manufacturing and sale of gypsum boards, respectively. Opportunity B indicates a need for a company that installs wall coverings, and is therefore associated with unified code "3333C." This is also the case for Opportunity C which indicates the need for a company that hangs drywall. Opportunity D indicates a need for a contractor for repairs of AIA code 09 21 216.23 wall assemblies, which is linked to unified code 3333D, for "Gypsum Boards—Repair."

FIG. 5 is a flowchart depicting a method 1000 for training a machine learning-based code recommendation model 404. At 1002, a labeled data set including profile inputs and known code entries can be received or provided. At 1004, the labeled data set can be divided into training data and test data, for example, the training data set can comprise a certain percentage, such as 60% of the entries in the labeled data set. At 1006, the training data set, including the associated known code entries can be provided to the model. At 1008, the model can generate a first set of classification parameters by any appropriate method.

At 1010, some or all of the testing data set can be provided to the model, without the known code entries. At 1012, code recommendations generated by the model can be compared to the known code entries for each profile input in the test data set. If, at 1012, the recommendations show and acceptable amount of error, additional testing can occur by iterating at 1016. If, at 1012, the recommendations show an unacceptable amount of error, the classification parameters can be modified before proceeding to iterate at 1016. This testing phase can be iterated until the test data set is exhausted, until the amount of error consistently hits a minimum threshold, for a set period of time, or until some other criteria is met.

Figure 6:
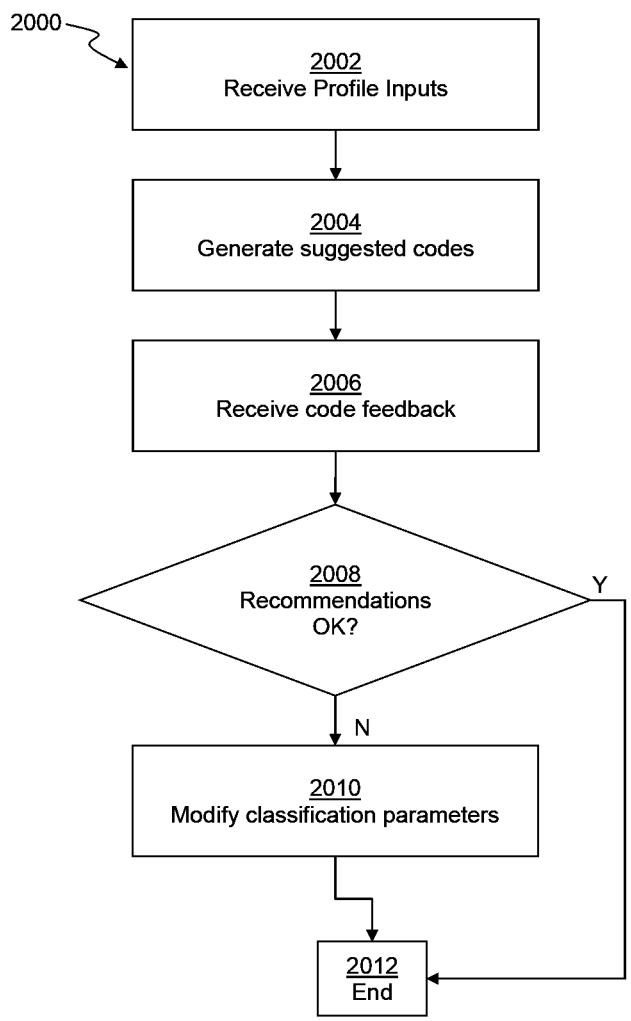
FIG. 6 is a flowchart depicting a method for updating a code recommendation model, according to an embodiment.

FIG. 6 is a flowchart depicting a method 2000 for providing code recommendations and updating the code recommendation model 406 during use. At 2002, profile inputs can be received. At 2004, the code recommendation model can generate suggested codes. At 2006, feedback regarding the suggested codes can be received via user interface engine 102. If, at 2008, at least one code recommendation was not accepted, the classification parameters of code recommendation model 406 can be modified at 2010 before processing ends at 2012. If, at 2008, if the codes were accepted, processing can end at 2012.

Figure 7:
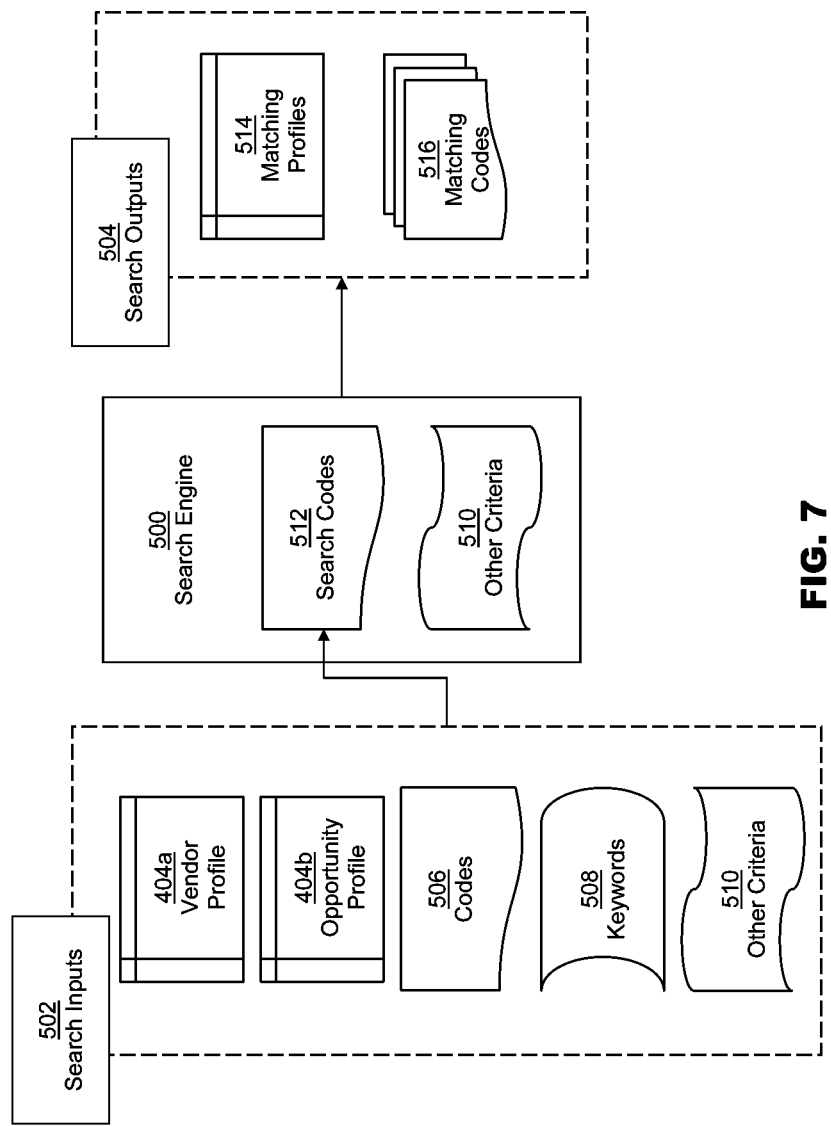
FIG. 7 is a schematic diagram depicting a search engine, according to an embodiment.

FIG. 7 is a schematic diagram depicting inputs and outputs of search engine 500. Search engine 500 can receive search inputs 502, and provide search outputs 504. In embodiments, user interface engine 102 can present a search interface to user computing device 104 and receive user-provided search input data. In embodiments, the search interface can present a plurality of identified fields, such that search inputs 502 are provided as labeled and structured data. In embodiments, the search interface can present one or more free text fields such that search inputs 502 can be parsed or extract from the text. Search inputs 502 can include one or more profiles 404, such as a vendor profile 404a or an opportunity profile 404b. For example, in embodiments, user interface 102 can present a link, button, or other control enabling the user to search for search outputs that match a selected profile. Search inputs 502 can further include one or more codes 506 (which can include code identifiers 308 and codebook identifiers 306), keywords 508, or other search criteria 510. Other search criteria 510 can include intents, such as a need or capability to manufacture, buy, sell, purchase, install, or remove a product or service. Other search criteria 510 can also include individual company capacity and capability data, government designations, locations, or other information as might be stored in profiles 404.

Search engine 500 can generate search codes 512. Search codes 512 can be extracted from codes present in search inputs 502, by for example, parsing any text string input to identify strings that match the format of known codebooks. Search engine 500 can also provide search inputs 502 to code recommendation model 406 for generation of one or more recommended codes based on search inputs 502. Search engine 502 can provide any extracted or generated codes to code translation engine 300 to receive on or more search codes 512. Search codes 512 can comprise or be linked to unified code entries 320.

Search outputs 504 can comprise matching profiles 514 and/or matching codes 516. Matching profiles 514 can comprise or be associated with vendor profiles 404a or opportunity profiles 404b as previously stored in data store 200. Search engine 500 can determine matching profiles 514 by querying data store 200 to find profiles 404 that have associated code entries 416 that match or correspond to search codes 512. Search engine 500 can further filter matching profiles 514 by any other search criteria provided 510. Similarly, search engine 516 can generate matching codes 516 by providing search codes 512 to code translation engine 300, and receiving one or more equivalent code entries. For example, search code 512 can comprise a unified code entry 520, and matching codes 516 can comprise any code entries 304 from other codebooks that are linked in a code translation table 318 or code link entry 312 having a primary code entry 314 that corresponds to search code 512.

The operation of search engine 500 can further be understood in light of the example profiles 404 and unified codes 416 depicted in FIG. 4C. As depicted, Vendor X is associated with unified code "3333A," as is Opportunity A. In embodiments, search engine 500 can present Opportunity A as a search result based on the profile of Vendor X. Similarly, because Opportunity A is associated with both unified code "3333A" and "3333B," a search based on the opportunity profile 404b of Opportunity A would present both Vendor X and Vendor Y. As will be appreciated, the search engine may return no results based on the profile of Opportunity D, as no vendor profiles 404a associated with unified code "3333D" are present in the system in this example. In embodiments, the results of Opportunity D can be updated if and when a vendor profile associated with unified code "3333D" is created.

Returning now to FIG. 1, communications engine 600 can facilitate communication between users of system 100, and/or with other outside individuals. In embodiments, communications engine can store and transmit messages between users of system 100. Communications engine can generate one or more electronic messages or documents based on profiles 404 and/or other information. For example, communications engine can generate an email to a contact of a vendor having a profile 404ba within system 100, when an opportunity profile 404b is created that requests unified codes that match or correspond with unified codes of the vendor profile 404a. Communications engine 600 can be configured with one or more forms or templates that can be automatically completed by communications engine 600 based on data within profiles 404. Communications engine 600 can therefore assist users such as vendors, agencies, investors, or others in the creation and maintenance of standard forms such as proposals, bids, estimates, or other documents that have specific format requirements.

Figure 8:
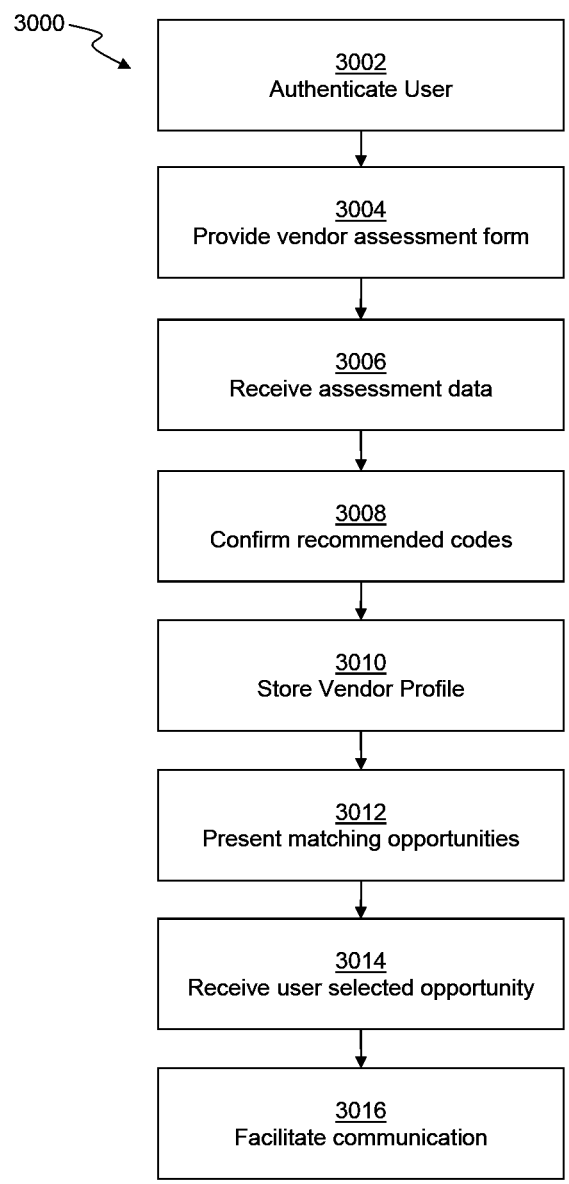
FIG. 8 is a flowchart depicting a method for vendor profile creation and search according to an embodiment.

FIG. 8 is a flowchart depicting a method 3000 for creating a vendor profile and searching for matching opportunities, according to an embodiment. At 3002, a user identity can be created and/or authenticated. At 3004, a vendor assessment form can be presented to the user computer device 104 by user interface engine 102. At 3006, assessment details, such as answers to questions on the vendor assessment form, can be received from the user by user computing device 104 and transmitted to user interface engine 104. At 3008, suggested codes can be extracted or generated, for example by execution of method 2000, described above with respect to FIG. 6, and confirmation of the codes can be received via user interface engine 102. At 3010, the vendor profile 404a can be stored in data store 200.

At 3012, in response to the creation of the vendor profile, a user request, or on a regularly scheduled basis, data store 200 can be searched to determine whether any opportunity profiles 404b that match one or more of the codes or other criteria of vendor profile 404b exist. Any matching opportunity profiles 404b can be presented to the user. At 3014, user selection of one or more selected opportunity profiles can be received. At 3016, communication can be facilitated between the user and other users or entities corresponding to the selected opportunity profiles.

Figure 9:
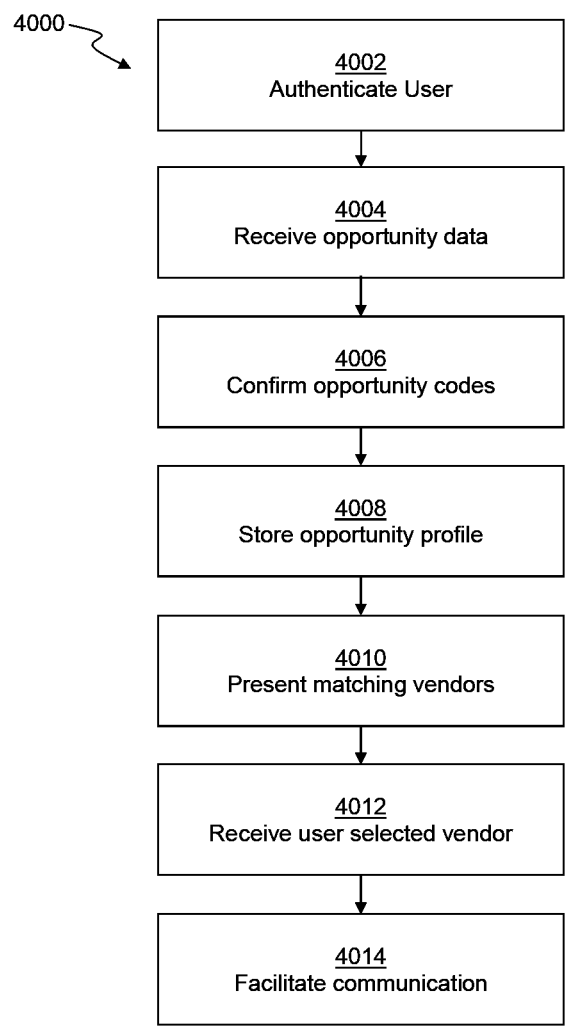
FIG. 9 is a flowchart depicting a method for opportunity profile creation and search according to an embodiment.

FIG. 9 is a flowchart depicting a method 4000 for creating an opportunity profile and searching for matching vendors, according to an embodiment. At 4002, a user identity can be created and/or authenticated. At 4004, opportunity data can be received, for example, the user can upload a request for proposal, provide a textual or structured description of the opportunity, or provide a link to opportunity information in an external data source. At 4006, suggested codes can be extracted or generated, for example by execution of method 2000, described above with respect to FIG. 6, and confirmation of the codes can be received via user interface engine 102. At 4008, the opportunity profile 404b can be stored in data store 200.

At 4010, in response to the creation of the opportunity profile, a user request, or on a regularly scheduled basis, data store 200 can be searched to determine whether any vendor profiles 404a that match one or more of the codes or other criteria of opportunity profile 404b exist. Any matching vendor profiles 404a can be presented to the user. At 4012, user selection of one or more selected vendor profiles can be received. At 4014, communication can be facilitated between the user and other users or entities corresponding to the selected vendor profiles.

Embodiments of the present disclosure can enable several use cases to facilitate processes involved with the creation and fulfillment of procurement opportunities. A first user can be an individual or company seeking to sell their goods or services. A second user can be an individual or company looking to sub-contract or hire another individual or company for their goods or services as part of or for an entire project/job, such as a project owners, a government agency, a general contractor, or the like. A third user might be an individual or company looking to solicit business partnership with other users, such as a potential partner or investor.

Embodiments can enable the first user to complete an assessment entering company data, background, statistics, demographics, and current conditions of the business, including any codes that the first user is aware of identifying their business. Embodiments can determine whether any equivalent codes entries that are associated or linked with the provided codes exist, and provide recommended related codes. The first user can select their desired matched codes, they can save them to a vendor profile. Embodiments enable the first user to make changes and update their codes or any other data within their vendor profile. by accessing their saved profile.

Embodiments can enable the first user to search for any procurement or contracting opportunity on the platform associated with code entries within the vendor profile, in combination with other search criteria that can include fields from opportunity profiles such as project identifiers, date range, project owners, industry type, service type, keyword, union affiliation, demographics, and other such qualifiers.

The first user can then be enabled to generate a report of all opportunities, view and determine which opportunities to respond to by means of phone, electronic email or submission of a response to a quote, proposal, invitation, information, or the like. Because the first user has received guidance regarding which codes to respond to, they are able to prepare their response each matching code into account in their proposal. Embodiments can enable the first user to upload and submit their response on the platform using these the unified codes and/or codes associated with the codebooks used by the selected opportunity profiles.

Similarly, embodiments will enable the first user to search for products, materials, supplies and service providers within the platform by cross referencing keywords with names of other users registered on the platform, or unified codes. Embodiments can also enable the first user to search for partners or investors in categories such as state, industry, or other criteria. Embodiments can further generate reports based on specified parameters and qualifiers.

Embodiments can enable the second user to complete a profile by entering company or agency data, background, statistics and the like. Further, embodiments can enable the creation of a portfolio of procurement or contract opportunities using codes such as NAICS, AIA, GSA Schedule, SIN codes, USDOT bid or item codes, and state/county/city procurement codes. When opportunity profile inputs are received, and an opportunity profile is created, embodiments can analyze code entries, and correlate, cross reference and provide suggestions or recommendations of related unified codes or codes in other codebooks. The second user can confirm the desired recommended codes and the opportunity profile can be saved.

Embodiments can enable the second user to generate a list or report of first users having vendor profiles that match or align with each of the opportunity profiles created by the second user. The matches can be based on translated or unified codes. The second user can be enabled to view and determine which, if any users they wish to interact with by means of phone, electronic mail or request a quote, proposal, invitation, information, or the like. Because the second user knows which codes they require for each procurement or contract opportunity, the second user is able to target the vendors having profiles including matching codes. Because the unified codes of each vendor can indicate characteristics that may indicate qualification as a targeted group business or disadvantaged business entity, the second user can also filter based on vendors meeting those standards.

Embodiments can enable users to view any uploaded or submitted proposal or bid response associated with their opportunities. Further, embodiments can provide the ability to select (award) or reject the any uploaded/submitted proposal or bid response through the user interface.

Embodiments can enable users to search for products, materials, supplies, and service providers by cross referencing qualifiers such as keywords, industries, other procurement codes, and the like with names or other details of vendors registered on the platform Embodiments can provide generated reports based on specified parameters and qualifiers.

Embodiments can enable the third user to complete a profile by entering company data, background, and statistics, and the like. Embodiments can enable the third user to create a portfolio of services using industry or government codes, which can be translated to unified codes. Services can comprise one or more vendor profiles and/or opportunity profiles. Once a profile is created, embodiments can analyze the code entries and provide suggested unified codes or codes based on other codebooks. The third user can be enabled to generate a list or reports of vendor profiles and opportunity profiles that are associated with the codes provided in the service opportunity. The third user can be enabled to view and determine which users they wish to interact with.

The various technical advantages and improvements presented by embodiments of the present disclosure will be evident to those of skill in the art, a selection of which is discussed herein. Profiles 404 can be associated or linked with unified codes 320, instead of disparate entries from a plurality of codebooks. As such, profiles 404 can present smaller memory footprints, as each profile 404 needs to only have one unified code 320 that can represent multiple code entries 304. This smaller memory footprint can result in the conservation of network and data storage resources, and provide increased information processing and transmission speeds.

Unified codes 320 further provide a standardized format for communication between multiple users, whether associated with vendors or opportunities, regardless of the codebook(s) that are used by the various industries, agencies and other entities involved.

By presenting assessment forms or questionnaires via user interface engine 102, embodiments can receive information regarding vendors and opportunities in a structured format that can be more readily converted to code entries or unified code entries based on simple keyword searching. In addition, code recommendation model can be updated as new keywords or other parameters are determined to be appropriate.

By directly facilitating communication between entities associated with vendors and opportunities, embodiments of the present disclosure also improve data storage footprints, and provide increased security by avoiding unnecessary transmission of data through intermediaries such as email or automatic procurement systems.

Embodiments of the present disclosure can present one or more APIs to facilitate transmission of data between a plurality of external entities. For example, by presenting a common profile creation API, vendors and entities associated with opportunities can programmatically interact with embodiments to receive data in a common standardized format.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

In one embodiment, the system 100 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. A system for procurement data management, the system comprising:
 a memory comprising a data store, the data store storing:
  a first procurement code entry comprising a first codebook identifier and a first code identifier, a second procurement code entry comprising a second codebook identifier and a second code identifier, a unified code entry comprising a unified code identifier and a description comprising:
   a subject corresponding to a specific service, article of manufacture, classification, or category derived based on a plurality of codebooks;

an intent corresponding to an activity needed or performed with respect to the specific service, article of manufacture, classification, or category; and a code link entry, the code link entry comprising a reference to the unified code identifier as a primary code entry, and references to the first code entry and second code entry, respectively, as equivalent code entries;

a processor coupled to the memory and programmed with executable instructions, the instructions including:

a user interface engine configured to receive a search parameter corresponding to the description from a user computing device communicably couplable to the processor, and to present one or more search results to the user computing device;

a search engine configured to identify the unified code entry based on the search parameter and the description; and a code translation engine configured to receive the unified code entry, access the code link entry having the unified code identifier as the primary code entry, and to determine the one or more search results by selecting the equivalent code entries of the code link entry.

2. The system of claim 1, wherein the data store further stores: a vendor profile, the vendor profile including a reference to the unified code entry; and wherein the search engine is further configured to identify the vendor profile based on the search parameter and the description.

3. The system of claim 1, wherein the data store further stores: an opportunity profile, the opportunity profile including a reference to the unified code entry; and wherein the search engine is further configured to identify the opportunity profile based on the search parameter and the description.

4. The system of claim 1, wherein the data store further stores: a vendor profile, and an opportunity profile, each of the vendor profile and the opportunity profile including a reference to the unified code entry.

5. The system of claim 4, wherein the search engine is further configured to identify the vendor profile and the opportunity profile based on the search parameter and the description.

6. The system of claim 4, wherein the search parameter comprises a reference to the vendor profile, and wherein the search engine is further configured to identify the opportunity profile based on the vendor profile and the description.

7. The system of claim 4, wherein the search parameter comprises a reference to the opportunity profile, and wherein the search engine is further configured to identity the vendor profile based on the opportunity profile and the description.

8. The system of claim 1, wherein the instructions further include:

a profile creation engine configured to receive profile inputs, generate one or more recommended code entries based on the profile inputs, and store a profile in the data store, the profile including a reference to at least one of the recommended code entries.

9. The system of claim 8, wherein the profile input is a vendor profile input and the profile is a vendor profile.

10. The system of claim 8, wherein the profile input is an opportunity profile input and the profile is an opportunity profile.

11. The system of claim 8, wherein the user interface engine is further configured to present the one or more recommended code entries to the user computing device to receive an indication of user confirmation or rejection.

12. The system of claim 11, wherein the profile creation engine further comprises a code recommendation model, the code recommendation model configured to generate the one or more recommended code entries based on the profile inputs and at least one machine-learning parameter, and to modify the at least one machine-learning parameter if the user interface engine receives an indication of user rejection.

13. A method for procurement code management, the method comprising:

storing, in a data store of a memory:

a first procurement code entry comprising a first codebook identifier and a first code identifier, a second procurement code entry comprising a second codebook identifier and a second code identifier, a unified code entry comprising a unified code identifier and a description comprising:

a subject corresponding to a specific service, article of manufacture, classification, or category derived based on a plurality of codebooks;

an intent corresponding to an activity needed or performed with respect to the specific service, article of manufacture, classification, or category; and a code link entry, the code link entry comprising a reference to the unified code identifier as a primary code entry, and references to the first code entry and second code entry, respectively, as equivalent code entries;

receiving, by a processor coupled to the memory, a search parameter corresponding to the description from a user computing device communicably coupleable to the processor;

identifying the unified code entry by searching the data store for a unified code entry having a description corresponding to the search parameter;

accessing the code link entry having the unified code identifier as the primary code entry, and determining search results comprising the first code entry and the second code entry; and transmitting the search results to the user computing device for presentation to the user.

14. The method of claim 13, further comprising storing a vendor profile and an opportunity profile, each of the vendor profile and the opportunity profile including a reference to the unified code entry, and wherein the search results further comprise at least one of the vendor profile or the opportunity profile.

15. The method of claim 14, further comprising identifying the vendor profile and the opportunity profile based on the search parameter and the description.

16. The method of claim 14, further comprising:

receiving profile inputs;

generating one or more recommended code entries based on the profile inputs; and storing a profile in the data store, the profile including a reference to at least one of the recommended code entries.

17. The method of claim 16, further comprising:

transmitting the presenting the one or more recommended code entries to the user computing device to receive an indication of user confirmation or rejection.

18. The method of claim 16, wherein the one or more recommended code entries are generated by a code recommendation model based on the profile inputs and at least one machine-learning parameter, the method further comprising:

modifying the at least one machine-learning parameter if the user interface engine receives an indication of user rejection.

19. The method of claim 14 further comprising:
facilitating communication between a first user associated with the vendor profile and a second user associated with the opportunity profile.

20. The method of claim 19, wherein facilitating communication between the first user and the second user comprises performing an action selected from the group consisting of: transmitting a recommendation to the first user to submit a proposal for to the second user, and transmitting a recommendation to the second user for the second user send a request for proposal to the first user.

* * * * *